United States Patent
Yamaguchi

(10) Patent No.: US 9,978,524 B2
(45) Date of Patent: May 22, 2018

(54) MULTILAYER CERAMIC CAPACITOR AND MANUFACTURING METHOD THEREFOR

(71) Applicant: Murata Manufacturing Co., Ltd., Nagaokakyo-shi, Kyoto-fu (JP)

(72) Inventor: Shinichi Yamaguchi, Nagaokakyo (JP)

(73) Assignee: MURATA MANUFACTURING CO., LTD., Nagaokakyo-Shi, Kyoto-Fu (JP)

( * ) Notice: Subject to any disclaimer, the term of this patent is extended or adjusted under 35 U.S.C. 154(b) by 0 days. days.

(21) Appl. No.: 15/488,867

(22) Filed: Apr. 17, 2017

(65) Prior Publication Data

US 2017/0316883 A1 Nov. 2, 2017

(30) Foreign Application Priority Data

Apr. 28, 2016 (JP) ................. 2016-090944

(51) Int. Cl.
- *H01G 4/12* (2006.01)
- *C04B 35/468* (2006.01)
- *H01G 4/30* (2006.01)
- *C04B 35/465* (2006.01)

(52) U.S. Cl.
CPC ......... *H01G 4/306* (2013.01); *C04B 35/465* (2013.01); *H01G 4/1227* (2013.01); *H01G 4/30* (2013.01); *H01G 4/1218* (2013.01); *H01G 4/1245* (2013.01)

(58) Field of Classification Search
CPC .......................... H01G 4/1227; C04B 35/4682
See application file for complete search history.

(56) References Cited

U.S. PATENT DOCUMENTS

| | | | |
|---|---|---|---|
| 8,830,651 B2* | 9/2014 | Yamaguchi | H01B 3/12 361/301.2 |
| 2014/0078642 A1* | 3/2014 | Shinichi | H01B 3/12 361/301.4 |

FOREIGN PATENT DOCUMENTS

JP 2005194138 A 7/2005

* cited by examiner

*Primary Examiner* — Karl E Group
(74) *Attorney, Agent, or Firm* — Arent Fox LLP

(57) ABSTRACT

A multilayer ceramic capacitor that includes a laminated body of multiple dielectric layers and internal electrodes laminated alternately therewith. The dielectric layers contain Ba, Sr, Ti, Ca, Zr, Mg, and R, where R represents at least one element of Y, La, Sm, Eu, Gd, Tb, Dy, Ho, Er, Tm, and Yb. When Ti is 100 parts by mol, the dielectric layers contain Sr at 0.5 to 3.0 parts by mol; Ca at 3 to 15 parts by mol; Zr at 0.05 to 3.0 parts by mol; Mg at 0.01 to 0.09 parts by mol; and R at 2.5 to 8.4 parts by mol.

16 Claims, 3 Drawing Sheets

MULTILAYER CERAMIC CAPACITOR AND MANUFACTURING METHOD THEREFOR

CROSS REFERENCE TO RELATED APPLICATIONS

The present application claims priority to Japanese Patent Application No. 2016-090944, filed Apr. 28, 2016, the entire contents of which are incorporated herein by reference.

BACKGROUND OF THE INVENTION

Field of the Invention

The invention relates to a multilayer ceramic capacitor and a method for manufacturing the capacitor, and more particularly, to a multilayer ceramic capacitor including a laminated body that has multiple dielectric layers and internal electrodes laminated alternately, and a method for manufacturing the capacitor.

Description of the Related Art

As dielectric ceramic materials constituting multiple dielectric ceramic layers included in multilayer ceramic capacitors, $BaTiO_3$-based ceramic materials may be used in order to achieve high dielectric constants. In particular, $(BaCa)TiO_3$ of $BaTiO_3$ with some of Ba substituted with Ca can achieve high reliability (high-temperature load life) and favorable capacitance-temperature characteristics.

Now, in recent years, with the reduction in size and increase in capacitance for multilayer ceramic capacitors, dielectric elements have been more and more reduced in thickness. Accordingly, the intensities of electric fields applied to the dielectric elements have been increased, and the design for ensuring of reliability has become more difficult.

As a means for the ensuring of reliability, Japanese Patent Application Laid-Open No. 2005-194138 proposes a method of obtaining a dielectric ceramic through the addition of various elements in certain amounts. More specifically, the dielectric ceramic described in Japanese Patent Application Laid-Open No. 2005-194138 is expressed by the composition formula: $100\ (Ba_{1-x}Ca_x)_mTiO_3+aMnO+bV_2O_5+cSiO_2+dRe_2O_3$ (provided that Re represents at least one metal element selected from among Y, La, Sm, Eu, Gd, Tb, Dy, Ho, Er, Tm, and Yb), and configured such that x, m, a, b, c, and d respectively meet the respective conditions of: $0.030 \le x \le 0.20$; $0.990 \le m \le 1.030$; $0.010 \le a \le 5.0$; $0.050 \le b \le 2.5$; $0.20 \le c \le 8.0$; and $0.050 \le d \le 2.5$.

SUMMARY OF THE INVENTION

However, it has been found that the dielectric ceramic mentioned above has, for example, when a high electric field intensity of, for example, 30 kV/mm or more is applied with the dielectric ceramic used for a multilayer ceramic capacitor, the electric field is locally concentrated due to variation in solid solubility of additives such as Y, La, Sm, Eu, Gd, TB, Dy, Ho, Er, Tm, and Yb, thereby making variation in lifetime more likely to be caused in a high-temperature load test.

The present invention is intended to solve the problem mentioned above, and an object of the invention is to provide a multilayer ceramic capacitor where variation in lifetime is small in a high-temperature load test, and a method for manufacturing the capacitor.

The multilayer ceramic capacitor according to the present invention is a multilayer ceramic capacitor including a laminated body of multiple dielectric layers and internal electrodes laminated alternately therewith. The laminated body includes a first principal surface and a second principal surface opposed to each other in a thickness direction that is a direction in which the dielectric layers and the internal electrodes are laminated; a first side surface and a second side surface opposed to each other in a width direction orthogonal to the thickness direction; and a first end surface and a second end surface opposed to each other in a length direction orthogonal to the thickness direction and the width direction. The dielectric layers contain Ba, Sr, Ti, Ca, Zr, Mg, and R, where R represents at least one element of Y, La, Sm, Eu, Gd, Tb, Dy, Ho, Er, Tm, and Yb. Also, the dielectric layers contain, when Ti is 100 parts by mol, Sr at 0.5 to 3.0 parts by mol; Ca at 3 to 15 parts by mol; Zr at 0.05 to 3.0 parts by mol; Mg at 0.01 to 0.09 parts by mol; and R at 2.5 to 8.4 parts by mol. The laminated body has a length of 1.0 mm to 3.2 mm, a width of 0.5 mm to 2.5 mm, and a thickness of 0.5 mm to 2.5 mm, and each dielectric layer has a thickness of 0.4 μm to 3.0 μm.

Further, the multilayer ceramic capacitor according to the present invention is a multilayer ceramic capacitor including a laminated body of multiple dielectric layers and internal electrodes laminated alternately therewith. The laminated body includes a first principal surface and a second principal surface opposed to each other in a thickness direction that is a direction in which the dielectric layers and the internal electrodes are laminated; a first side surface and a second side surface opposed to each other in a width direction orthogonal to the thickness direction; and a first end surface and a second end surface opposed to each other in a length direction orthogonal to the thickness direction and the width direction. The laminated body contains Ba, Sr, Ti, Ca, Zr, Mg, and R, where R represents at least one element of Y, La, Sm, Eu, Gd, Tb, Dy, Ho, Er, Tm, and Yb. The laminated body also contains, when Ti is 100 parts by mol, Sr at 0.5 to 3.0 parts by mol; Ca at 3 to 15 parts by mol; Zr at 0.05 to 3.0 parts by mol; Mg at 0.01 to 0.09 parts by mol; and R at 2.5 to 8.4 parts by mol. The laminated body has a length of 1.0 mm to 3.2 mm, a width of 0.5 mm to 2.5 mm, and a thickness of 0.5 mm to 2.5 mm or less, and each dielectric layer has a thickness of 0.4 μm to 3.0 μm.

Further, the multilayer ceramic capacitor according to the present invention is a multilayer ceramic capacitor including a laminated body of multiple dielectric layers and internal electrodes laminated alternately therewith. The laminated body includes a first principal surface and a second principal surface opposed to each other in a thickness direction that is a direction in which the dielectric layers and the internal electrodes are laminated; a first side surface and a second side surface opposed to each other in a width direction orthogonal to the thickness direction; and a first end surface and a second end surface opposed to each other in a length direction orthogonal to the thickness direction and the width direction. The laminated body contains Ba, Sr, Ti, Ca, Zr, Mg, and R, where R represents at least one element of Y, La, Sm, Eu, Gd, Tb, Dy, Ho, Er, Tm, and Yb. When the laminated body is subjected to a dissolution treatment to provide a solution, when Ti in the solution is 100 parts by mol, the solution contains Sr at 0.5 to 3.0 parts by mol; Ca at 3 to 15 parts by mol; Zr at 0.05 to 3.0 parts by mol; Mg at 0.01 to 0.09 parts by mol; and R at 2.5 to 8.4 parts by mol.

The laminated body has a length of 1.0 mm to 3.2 mm, a width of 0.5 mm to 2.5 mm, and a thickness of 0.5 mm to 2.5 mm, and each dielectric layer has a thickness of 0.4 μm to 3.0 μm.

In addition, the method for manufacturing a multilayer ceramic capacitor according to the present invention includes alternately stacking ceramic green sheets for dielectric layers and electrode material layers for internal electrodes so as to form an unfired stacked body; and firing the unfired stacked body to produce a fired laminated body having a length of 1.0 mm to 3.2 mm, a width of 0.5 mm to 2.5 mm, and a thickness of 0.5 mm to 2.5 mm; and each dielectric layer having a thickness of 0.4 μm to 3.0 μm, wherein the ceramic green sheets for the dielectric layers contain Ba, Sr, Ti, Ca, Zr, Mg, and R, where R represents at least one element of Y, La, Sm, Eu, Gd, Tb, Dy, Ho, Er, Tm, and Yb, and when Ti is 100 parts by mol, Sr is 0.5 to 3.0 parts by mol; Ca is 3 to 15 parts by mol; Zr is 0.05 to 3.0 parts by mol; Mg is 0.01 to 0.09 parts by mol; and R is 2.5 to 8.4 parts by mol.

The multilayer ceramic capacitor and method for manufacturing a multilayer ceramic capacitor according to the present invention is configured as described above, thereby making it possible to achieve a multilayer ceramic capacitor where variation in lifetime is small in a high-temperature load test.

DETAILED DESCRIPTION OF THE INVENTION

Features of the present invention will be further specifically described below with reference to an embodiment of the present invention.

Figure 1:
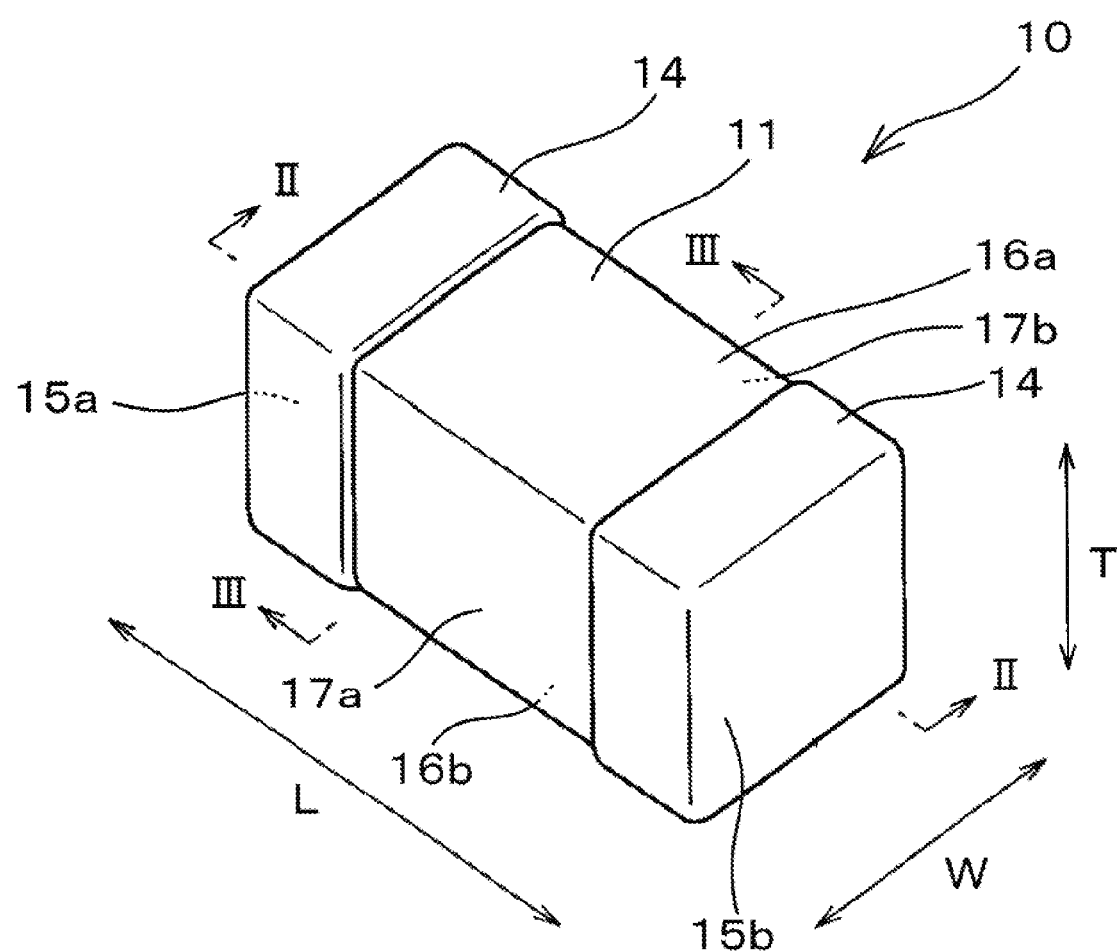
FIG. 1 is a perspective view of a multilayer ceramic capacitor according to an embodiment.
Figure 2:
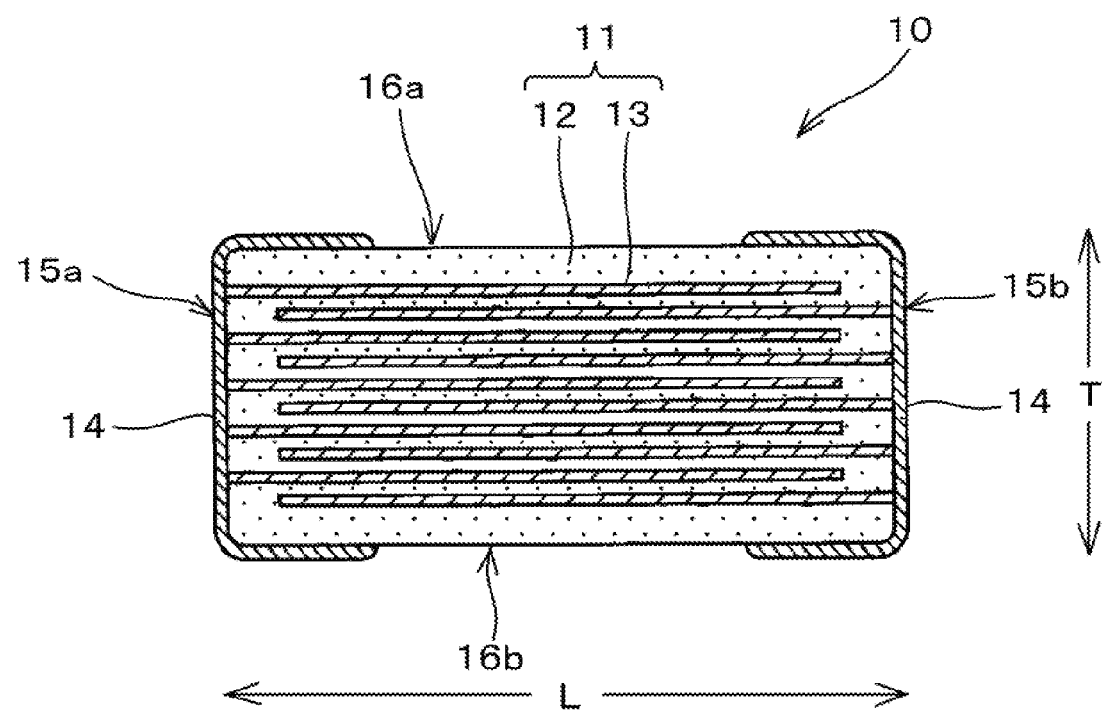
FIG. 2 is a cross-sectional view of the multilayer ceramic capacitor shown in FIG. 1 along the line II-II.
Figure 3:
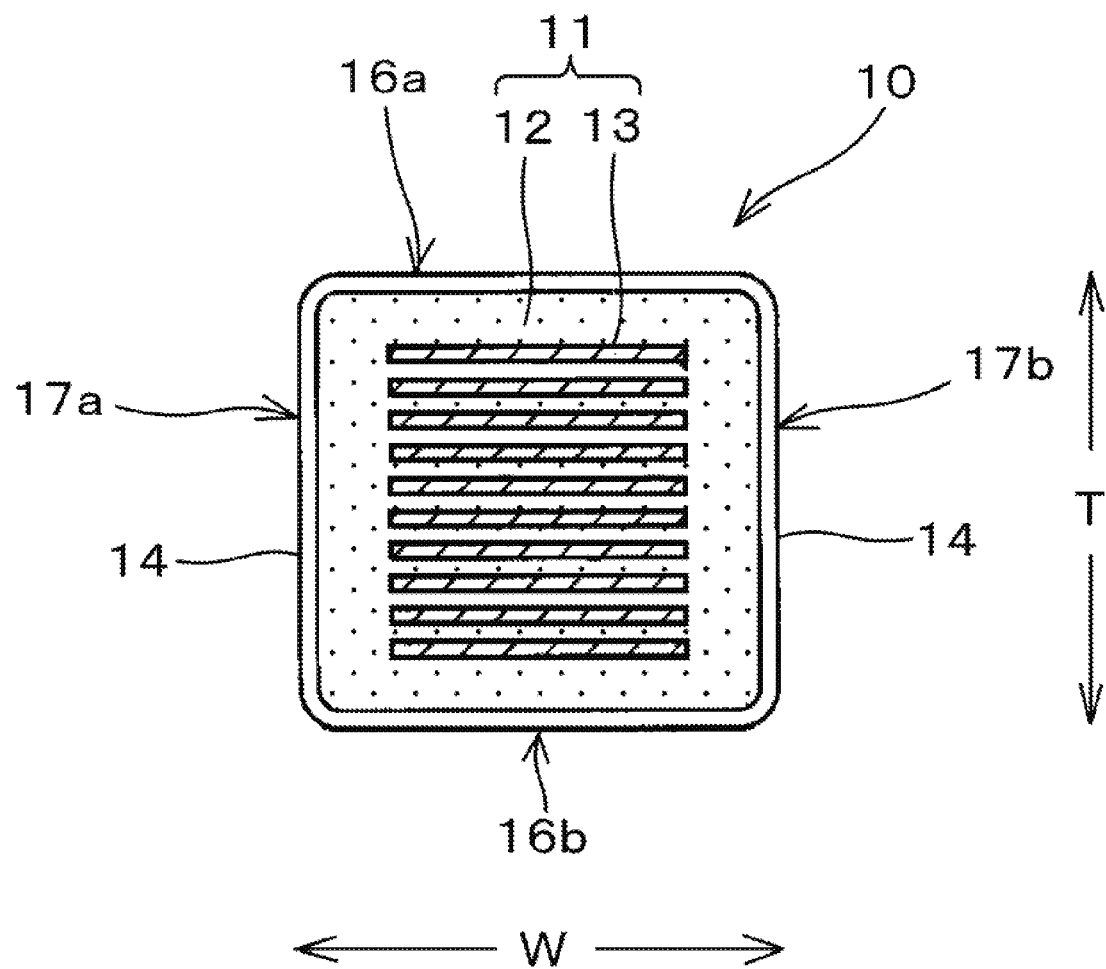
FIG. 3 is a cross-sectional view of the multilayer ceramic capacitor shown in FIG. 1 along the line III-III.

FIG. 1 is a perspective view of a multilayer ceramic capacitor 10 according to an embodiment. FIG. 2 is a cross-sectional view of the multilayer ceramic capacitor 10 shown in FIG. 1 along the line II-II. FIG. 3 is a cross-sectional view of the multilayer ceramic capacitor 10 shown in FIG. 1 along the line III-III.

As shown in FIGS. 1 to 3, the multilayer ceramic capacitor 10, which is an electronic component that has a cuboid shape as a whole, has a laminated body 11 and a pair of external electrodes 14.

As shown in FIGS. 2 and 3, the laminated body 11 includes dielectric layers 12 and internal electrodes 13 laminated alternately. More specifically, the multiple dielectric layers 12 and the multiple internal electrodes 13 are laminated alternately to form the laminated body 11.

In this regard, the direction in which the pair of external electrodes 14 is arranged is defined as the length direction of the multilayer ceramic capacitor 10, the direction in which the dielectric layers 12 and the internal electrodes 13 are laminated is defined as the thickness direction thereof, and one direction orthogonal to both of the length direction and the thickness direction is defined as the width direction thereof.

The laminated body 11 has a first principal surface 16a and a second principal surface 16b opposed in the thickness direction, a first side surface 17a and a second side surface 17b opposed in the width direction, and a first end surface 15a and a second end surface 15b opposed in the length direction.

The laminated body 11 preferably has rounded corners and ridges. In this regard, the corner refers to the intersection of three surfaces of the laminated body 11, and the ridge refers to the intersection of two surfaces of the laminated body 11.

According to this embodiment, the thickness that is a dimension of the laminated body 11 in the laminating direction is 0.8 mm to 2.5 mm, the length that is a dimension of the laminated body 11 in the direction of connecting the first end surface 15a and the second end surface 15b is 1.6 mm to 3.2 mm, and the width that is a dimension thereof in the direction of connecting the first side surface 17a and the second side surface 17b is 0.8 mm to 2.5 mm. The dimensions of the laminated body 11 can be measured with one of a micrometer and an optical microscope.

It is to be noted that the laminated body 11 has substantially the same size as the multilayer ceramic capacitor 10.

Accordingly, it is possible to restate the size of the multilayer ceramic capacitor 10 explained in this specification as the size of the laminated body 11. Inversely, it is possible to restate the size of the laminated body 11 explained in this specification as the size of the multilayer ceramic capacitor 10.

The dielectric layers 12 include outer layer parts and an inner layer part. The outer layer parts are located close to the first principal surface 16a and second principal surface 16b of the laminated body 11, that is, on both outer sides of the laminated body 11 in the thickness direction. More specifically, the outer layer parts of the dielectric layers 12 are located respectively between the first principal surface 16a and the internal electrode 13 closest to the first principal surface 16a, and between the second principal surface 16b and the internal electrode 13 closest to the second principal surface 16b. The outer layer part is preferably 30 μm to 120 μm in thickness. Among the dielectric layers 12, the part sandwiched between the two outer layer parts serves as the inner layer part.

The number of the dielectric layers 12 varies depending on the size of the laminated body 11. The dielectric layer 12 is preferably 0.4 μm to 3.0 μm in thickness. It has been determined that the dielectric layer 12 in excess of 3.0 μm in thickness makes it difficult to achieve the effect of reduced variation in lifetime in a high-temperature load test.

The number of the dielectric layers 12 in the inner layer part is preferably 150 to 420 when the laminated body 11 is 0.8 mm in thickness, 250 to 700 when the laminated body 11 is 1.6 mm in thickness, or 550 to 1500 when the laminated body 11 is 2.5 mm in thickness.

The dielectric layers 12 have a perovskite-type compound containing Ba, Sr, Ti, Ca, Zr, Mg, and R. Ca is present around the centers of crystal grains constituting the dielectric layers 12. In addition, R may have at least one of rare-earth elements Y, La, Sm, Eu, Gd, Tb, Dy, Ho, Er, Tm, and Yb, or contain multiple types thereof.

The dielectric layers 12 contain therein respective elements in terms of part by mol as follows, when the amount of Ti is regarded as 100 parts by mol: Sr is 0.5 parts to 3.0 parts by mol; Ca is 3 to 15 parts by mol; Zr is 0.05 to 3.0 parts by mol; Mg is 0.01 to 0.09 parts by mol; and a total of R is 2.5 to 8.4 parts by mol.

In this regard, the total of R refers to, when multiple types of R are included, the total amount of the contents in terms of part by mol for the multiple types of R elements included.

The contents in terms of part by mol for each element included in the dielectric layers 12, that is, the proportions of Ba, Sr, Ca, Zr, Mg, and R with respect to Ti can be obtained in a way that the dielectric layers 12 are subjected to a dissolution treatment to provide a solution, and subjected to an ICP analysis.

In addition, as long as the internal electrodes 13 contain none of the respective elements of Ba, Sr, Ti, Ca, Zr, Mg, and R included in the dielectric layers 12, the laminated body 11 is made into a solution, and the proportions of the respective elements of Ba, Sr, Ti, Ca, Zr, Mg, and R included in the solution is determined, thereby making it possible to figure out the proportions of the respective elements of Ba, Sr, Ti, Ca, Zr, Mg, and R included in the dielectric layers 12. In addition, as long as the internal electrodes 13 and the external electrodes 14 contain none of the respective elements of Ba, Sr, Ti, Ca, Zr, Mg, and R included in the dielectric layers 12, the multilayer ceramic capacitor 10 is made into a solution, and the proportions of the respective elements of Ba, Sr, Ti, Ca, Zr, Mg, and R included in the solution is determined, thereby making it possible to figure out the proportions of the respective elements of Ba, Sr, Ti, Ca, Zr, Mg, and R included in the dielectric layers 12.

According to this embodiment, the laminated body 11 is subjected to dissolution treatment to provide a solution, and subjected to an ICP analysis, thereby figuring out the proportions of respective elements Ba, Sr, Ti, Ca, Zr, Mg, and R included in the dielectric layers 12.

In this regard, methods for making the laminated body 11 into a solution include, for example, a method of dissolving the laminated body 11 with an acid, thereby providing a solution, and a method of causing the laminated body 11 to be subjected to alkali fusion, and then dissolved with an acid or the like, thereby providing a solution. Thus, the method of providing a solution by dissolution treatment is not particularly limited.

The dielectric layers 12 are ceramic layers including a perovskite-type compound containing Ba and Ti, and other accessory constituents. Examples of the perovskite-type compound containing Ba and Ti include perovskite-type compounds represented by the general formula $A_mBO_3$ as barium titanate-based ceramics. The A site represents Ba, which may contain, besides Ba, at least one selected from the group consisting of Sr and Ca. The B site represents Ti, which may contain Zr besides Ti. O represents oxygen. In addition, m represents the molar ratio between the A site and the B site.

The XRD structural analysis of the laminated body 11 has made it clear that the main constituent of the dielectric layers 12 has a barium titanate-based perovskite-type structure.

The accessory constituents include R and Mg. The accessory constituents may be present in any form in the dielectric layers 12. For example, the accessory constituents may be present in crystal grains of the perovskite-type compound. Specifically, preferred are grains each composed of: a core part of a perovskite-type compound containing Ba and Ti; and a shell part formed from a solid solution of elements as accessory constituents around the core part. Alternatively, the accessory constituents may be present, in forms such as oxides at crystal grain boundaries and triple points.

According to this embodiment, the elements constituting the dielectric layers 12 include Sr. The addition of Sr to a composition system that has a large amount of R rare-earth element can suppress variation in solid solubility of rare earth, and reduce variation in lifetime for each multilayer ceramic capacitor 10 in a high-temperature load test. More specifically, when the variation in solid solubility of rare earth is caused, the time to failure, that is, the lifetime varies significantly because there is a multilayer ceramic capacitor which is short in shortest time to failure in a high-temperature load test, but the suppressed variation in solid solubility of rare earth can reduce variation in lifetime in a high-temperature load test. This is assumed to be because the addition of Sr improves degreasing performance at relatively low temperatures, thereby removing carbon constituents, without the presence of the carbon constituents in high-temperature ranges for solid solutions of rare earths.

The carbon constituents vary the atmosphere in the case of firing, because the constituents are bonded to oxygen at high temperatures. When the atmosphere varies locally, the timing of producing a solid solution of the rare earth varies, thereby resulting in variation in solid solubility. This variation in solid solubility results in variation in shell thickness, when the R element as an accessory constituent constitutes the shell parts. Without the presence of the carbon constituents in the temperature ranges for solid solutions of rare earths, the variation in solid solubility can be reduced, thereby reducing the variation in lifetime in a high-temperature load test.

In particular, when the multilayer ceramic capacitor 10 falls within the ranges of: 1.6 mm to 3.2 mm in length L; 0.8 mm to 2.5 mm in width W; and 0.8 to 2.5 mm in thickness T, the effect is produced dominantly.

This laminated body 11 was polished, and processed into a thin section, ten crystal grains were then observed with a TEM (transmission electron microscope), and near the centers of the crystal grains, the presence or absence of Ca was determined by EDX (energy dispersive X-ray spectrometry). Then, Ca was detected from all of the crystal grains, while the content ratio of Ca to 100 parts by mol of Ti varied a little bit from one crystal grain to another. More specifically, it has been confirmed that the main constituent of the crystal grains is composed of a barium calcium titanate.

The internal electrodes 13 of the laminated body 11 include first internal electrodes that extend to the first end surface 15a and second internal electrodes that extend to the second end surface 15b. The first internal electrodes each include: an opposed electrode part that is a part opposed to the second internal electrode; and an extended electrode part that is a part from the opposed electrode part to the first end surface 15a of the laminated body 11. In addition, the second internal electrodes each include: an opposed electrode part that is a part opposed to the first internal electrode; and an extended electrode part that is a part from the opposed electrode part to the second end surface 15b of the laminated, body 11. The opposed electrode parts of the first internal electrodes and the opposed electrode parts of the second internal electrodes are opposed with the dielectric layers 12 interposed therebetween, thereby forming capacitance, and thus functioning as a capacitor.

The first internal electrodes and the second internal electrodes contain, for example, a metal such as Ni, Ag, Pd, an alloy of Ag and Pd, and Au. The first internal electrodes and the second internal electrodes may further include dielectric grains that have the same composition system as the ceramic included in the dielectric layers 12.

The first internal electrodes and the second internal electrodes are preferably 0.5 μm or more and 1.0 μm or less in thickness.

In this regard, the thickness for each of the multiple dielectric layers 12 and the thickness for each of the multiple internal electrodes 13 can be measured by the following method. While a method for measuring the thickness of the dielectric layers 12 will be described below, the same applies to the method for measuring the thickness of the internal electrodes 13.

First, a cross section of the laminated body 11 orthogonal to the length direction, exposed by polishing, is observed with a scanning electron microscope. Next, the thickness of the dielectric layer 12 is measured on five lines in total: a center line along the thickness direction, which passes through the center in a cross section of the laminated body 11; and two lines drawn at regular intervals from the center line to each side. The average value for the five measurement values is regarded as the thickness of the dielectric layer 12.

It is to be noted that in order to obtain the thickness more precisely, the laminated body 11 is divided into an upper part, a central part, and a lower part in the thickness direction, such five measurement values as described above are obtained for each of the upper part, central part, and lower part, and the average value for all of the measurement values obtained is regarded as the thickness of the dielectric layer 12.

The external electrodes 14 are formed to cover the entire end surfaces 15a and 15b of the laminated body 11, and partial regions of the principal surfaces 16a and 16b and side surfaces 17a and 17b, which are closer to the end surfaces 15a and 15b.

The external electrodes 14 each include a base electrode layer, and a plated layer disposed on the base electrode layer.

The base electrode layer includes at least one layer of a baked electrode layer, a resin electrode layer, and a thin-film electrode layer as described below.

The baked electrode layer is a layer including glass and a metal, which may have one layer or multiple layers. The metal included in the baked electrode layer contains, for example, at least one of Cu, Ni, Ag, Pd, an alloy of Ag and Pd, and Au. The baked electrode layer is a layer formed by applying a conductive paste including glass and a metal to the laminated body 11, and baking the paste. The baking may be carried out at the same time as firing for the internal electrodes 13, or may be carried out after firing for the internal electrodes 13. The thickest part of the baked electrode layer is preferably 40 μm or more and 180 μm or less in thickness.

The base electrode layer can be, for example, a resin electrode layer including conductive particles and a thermosetting resin. In the case of forming the resin electrode layer, the resin electrode layer may be formed directly on the laminated body 11 without forming the baked electrode layer. The resin electrode layer may have one layer or multiple layers.

The thin-film electrode layer is a layer of 1 μm or less with metallic particles deposited, which is formed by a known thin-film formation method such as a sputtering method or a vapor deposition method.

The plated layer disposed on the base electrode layer contains, for example, at least one of Cu, Ni, Ag, Pd, an alloy of Ag and Pd, and Au. The plated layer may have one layer or multiple layers. However, the plated layer preferably has a two-layer structure of a Ni plated layer and a Sn plated layer. The Ni plating layer serves the function of preventing the base electrode layer from being eroded by solder for mounting the multilayer ceramic capacitor 10. In addition, the Sn plated layer serves the function of improving the wettability of the solder for mounting the multilayer ceramic capacitor 10. The plated layer is preferably 1 μm or more and 10 μm or less in thickness pen each layer.

[Method for Manufacturing Multilayer Ceramic Capacitor]

In order to manufacture the multilayer ceramic capacitor 10, first, a powder of Ba compound such as $BaCO_3$ and a powder of Ti compound such as $TiO_2$ were prepared as starting raw materials for a perovskite-type compound containing Ba and Ti.

Next, the respective powders weighed were, if necessary, with the addition of an organic binder, a plasticizer and an organic solvent thereto, mixed with the use of a ball mill or the like, uniformly dispersed, and then subjected to a drying treatment, thereby providing a conditioned powder. Then, the conditioned powder obtained was subjected to calcination at a temperature from 1000° C. to 1200° C., thereby providing a main constituent powder of 0.2 μm in average particle size.

In addition, a powder of Ca compound as a Ca source, a powder of Mg compound as a Mg source, a Zr compound as a Zr source, a Sr compound as a Sr source, and an R compound as an R source were prepared respectively as accessory constituents. The forms of compounds to serve as accessory constituents are not to be considered particularly limited. More specifically, the compounds to serve as accessory constituents are not limited to any oxide powder or carbonate powder, but various forms of compounds can be used, such as chloride powders, sols, or metallic organic compounds.

In addition, the mixed form of the compounds to serve as accessory constituents are also not to be considered particularly limited. For example, multiple compounds for accessory constituents may be mixed in advance, or synthesized by heat treatment. In addition, a specific accessory constituent may be mixed in two or more separate stages.

Respective powders of $CaCO_3$, $MgCO_3$, $R_2O_3$, $ZrO_2$, and $SrCO_3$ were prepared herein as accessory constituents. Respective powders of $Y_2O_3$, $La_2O_3$, $Sm_2O_3$, $Eu_2O_3$, $Gd_2O_3$, $Tb_2O_3$, $Dy_2O_3$, $Ho_2O_3$, $Er_2O_3$, $Tm_2O_3$, and $Yb_2O_3$ were prepared as powders for $R_2O_3$.

Next, the respective powders of $CaCO_3$, $MgCO_3$, $R_2O_3$, $ZrO_2$, and $SrCO_3$ were weighed such that the contents of Ca, Mg, R, Zr, and Sr with respect to 100 parts by mol of Ti reached the proportions as shown in Tables 1A, 1B, and 1C, and added to the previously described main constituent powder, thereby providing a mixed powder as a dielectric raw material. It is to be noted that the content of Zr was increased by a minute amount on the order of 0.01 parts by mol, due to the incorporation from YSZ balls used for the mixing.

The mixed powder obtained was dissolved with an acid, and subjected to an ICP analysis, thereby confirming the composition of the respective elements in agreement with the composition as shown in Tables 1A, 1B, and 1C. It is to be noted that Tables 1A, 1B, and 1C include not only the above-described compositional proportions that meet the requirements of the present invention, but also compositional proportions that are different from the above-described compositional proportions.

Subsequently, the dielectric raw material was applied onto resin films, thereby providing ceramic green sheets for dielectric layers. In addition, a conductive paste for internal electrodes is prepared which contains Ni as its main constituent. The ceramic green sheets and the conductive paste for internal electrodes include a binder and a solvent, for which known organic binders and organic solvents can be used.

Onto the ceramic green sheets, the conductive paste as an electrode material for internal electrodes is applied in predetermined patterns by for example, screen printing or gravure printing, thereby forming internal electrode patterns.

Next, the ceramic green sheets and the electrode material layers for internal electrodes are stacked alternately, thereby forming an unfired stacked body. Specifically, the ceramic green sheets for outer layers without any internal electrode pattern formed are stacked to reach a predetermined number of sheets, the ceramic green sheets with the internal electrode patterns applied by printing are sequentially stacked thereon, and the ceramic green sheets for outer layers are stacked thereon to reach a predetermined number of sheets, thereby preparing a stacked sheet.

Subsequently, the stacked sheet prepared is subjected to pressing in the stacking direction by means such as isostatic press, thereby preparing a laminated block. Then, the laminated block prepared is cut into a predetermined size, thereby cutting out a laminated chip. In this regard, the laminated chip may have corners and ridges rounded by barrel polishing or the like.

Thereafter, the laminated chip was heated for 3 hours at a temperature of 350° C. in a $N_2$ atmosphere for burning the binder, and then subjected to firing for 2 hours at 1250° C. in a reducing atmosphere composed of a $H_2$—$N_2$—$H_2O$ gas with an oxygen partial pressure of $10^{-9}$ to $10^{-12}$ Mpa, thereby providing a fired laminated body. This sintered laminated body was dissolved, and subjected to an ICP analysis, thereby confirming that the composition of the respective constituents excluding Ni as an internal electrode constituent was almost identical to the composition prepared as shown in Tables 1A, 1B, and 1C. Further, it has been confirmed that the content of Zr was increased by a minute amount on the order of 0.02 parts by mol, due to the incorporation from YSZ balls used for the mixing.

A Cu paste containing glass frit was applied to both end surfaces of the laminated body, and baked at a temperature of 800° C. in a $N_2$ atmosphere to form external electrodes electrically connected to the internal electrode, thereby providing a multilayer ceramic capacitor.

Tables 1A, 1B, and 1C show characteristics of multilayer ceramic capacitors (samples of sample numbers 1 to 70 for characterization) prepared by the method described above. However, in Tables 1A, 1B, and 1C, the samples with the samples numbers marked with * refer to samples that fail to meet the requirements of the present invention, whereas the samples without * refer to samples that meet the requirements of the present invention.

TABLE 1A

| Sample Number | Composition (parts by mol/100 parts by mol of Ti) | | | | | | Chip Size | Relative Permittivity | High Temperature Load Test | |
|---|---|---|---|---|---|---|---|---|---|---|
| | Ca | Mg | R Type | R | Zr | Sr | | | MTTF (hr) | Shortest Time to Failure (hr) |
| 1 | 8 | 0.05 | Dy | 7 | 0.5 | 1.5 | Size 2 | 3243 | 37 | 15 |
| *2 | 8 | 0.005 | Dy | 7 | 0.5 | 1.5 | Size 2 | 3668 | 12 | 4 |
| 3 | 8 | 0.01 | Dy | 7 | 0.5 | 1.5 | Size 2 | 3214 | 31 | 14 |
| 4 | 8 | 0.07 | Dy | 7 | 0.5 | 1.5 | Size 2 | 3183 | 27 | 15 |
| 5 | 8 | 0.09 | Dy | 7 | 0.5 | 1.5 | Size 2 | 3103 | 39 | 17 |
| *6 | 8 | 0.13 | Dy | 7 | 0.5 | 1.5 | Size 2 | 2416 | 36 | 14 |
| *7 | 8 | 0.05 | Dy | 2 | 0.5 | 1.5 | Size 2 | 3594 | 11 | 5 |
| 8 | 8 | 0.05 | Dy | 2.5 | 0.5 | 1.5 | Size 2 | 3426 | 25 | 12 |
| 9 | 8 | 0.05 | Dy | 5 | 0.5 | 1.5 | Size 2 | 3381 | 28 | 14 |
| 10 | 8 | 0.05 | Dy | 5.7 | 0.5 | 1.5 | Size 2 | 3354 | 33 | 12 |
| 11 | 8 | 0.05 | Dy | 8.4 | 0.5 | 1.5 | Size 2 | 3047 | 41 | 16 |
| *12 | 8 | 0.05 | Dy | 8.6 | 0.5 | 1.5 | Size 2 | 2612 | 45 | 21 |
| *13 | 8 | 0.05 | Dy | 7 | 0.03 | 1.5 | Size 2 | 2555 | 33 | 12 |
| 14 | 8 | 0.05 | Dy | 7 | 0.05 | 1.5 | Size 2 | 3154 | 32 | 12 |
| 15 | 8 | 0.05 | Dy | 7 | 1.5 | 1.5 | Size 2 | 3221 | 35 | 14 |
| 16 | 8 | 0.05 | Dy | 7 | 3 | 1.5 | Size 2 | 3307 | 34 | 16 |
| 17 | 8 | 0.05 | Dy | 7 | 2 | 1.5 | Size 2 | 3307 | 34 | 16 |
| 18 | 8 | 0.05 | Dy | 7 | 1 | 1.5 | Size 2 | 3307 | 34 | 16 |
| *19 | 8 | 0.05 | Dy | 7 | 3.2 | 1.5 | Size 2 | 2618 | 38 | 17 |
| *20 | 2 | 0.05 | Dy | 7 | 0.5 | 1.5 | Size 2 | 2631 | 16 | 7 |
| 21 | 3 | 0.05 | Dy | 7 | 0.5 | 1.5 | Size 2 | 3179 | 35 | 13 |
| 22 | 11 | 0.05 | Dy | 7 | 0.5 | 1.5 | Size 2 | 3164 | 33 | 16 |
| 23 | 5 | 0.05 | Dy | 7 | 0.5 | 1.5 | Size 2 | 3164 | 33 | 16 |
| 24 | 10 | 0.05 | Dy | 7 | 0.5 | 1.5 | Size 2 | 3164 | 33 | 16 |
| 25 | 12 | 0.05 | Dy | 7 | 0.5 | 1.5 | Size 2 | 3164 | 33 | 16 |
| 26 | 15 | 0.05 | Dy | 7 | 0.5 | 1.5 | Size 2 | 3202 | 38 | 14 |
| *27 | 16 | 0.05 | Dy | 7 | 0.5 | 1.5 | Size 2 | 2640 | 31 | 15 |
| *28 | 8 | 0.05 | Dy | 7 | 0.5 | 0.4 | Size 2 | 3230 | 36 | 7 |

TABLE 1B

| Sample Number | Composition (parts by mol/100 parts by mol of Ti) | | | | | | Chip Size | Relative Permittivity | High Temperature Load Test | |
|---|---|---|---|---|---|---|---|---|---|---|
| | Ca | Mg | R Type | R | Zr | Sr | | | MTTF (hr) | Shortest Time to Failure (hr) |
| 29 | 8 | 0.05 | Dy | 7 | 0.5 | 0.5 | Size 2 | 3245 | 35 | 12 |
| 30 | 8 | 0.05 | Dy | 7 | 0.5 | 1.0 | Size 2 | 3199 | 35 | 14 |
| 31 | 8 | 0.05 | Dy | 7 | 0.5 | 2.5 | Size 2 | 3230 | 30 | 12 |
| 32 | 8 | 0.05 | Dy | 7 | 0.5 | 3.0 | Size 2 | 3289 | 35 | 15 |
| *33 | 8 | 0.05 | Dy | 7 | 0.5 | 3.1 | Size 2 | 3266 | 17 | 8 |
| *34 | 8 | 0.05 | Dy | 7 | 0.5 | 0.4 | Size 3 | 3300 | 35 | 8 |
| 35 | 8 | 0.05 | Dy | 7 | 0.5 | 1.5 | Size 3 | 3246 | 39 | 11 |
| *36 | 8 | 0.05 | Dy | 7 | 0.5 | 0.4 | Size 4 | 3213 | 34 | 7 |
| 37 | 8 | 0.05 | Dy | 7 | 0.5 | 1.5 | Size 4 | 3197 | 32 | 16 |
| *38 | 8 | 0.05 | Dy | 7 | 0.5 | 0.4 | Size 5 | 3180 | 33 | 6 |
| *39 | 8 | 0.05 | Dy | 7 | 0.5 | 1.5 | Size 5 | 3177 | 31 | 5 |
| *40 | 8 | 0.05 | Dy | 7 | 0.5 | 3.1 | Size 5 | 3201 | 14 | 3 |
| *41 | 8 | 0.05 | Y | 7 | 0.5 | 0.4 | Size 2 | 3034 | 31 | 4 |
| 42 | 8 | 0.05 | Y | 7 | 0.5 | 1.5 | Size 2 | 3056 | 34 | 12 |
| 43 | 8 | 0.05 | Y | 7 | 0.5 | 1.5 | Size 2 | 3040 | 33 | 17 |
| *44 | 8 | 0.05 | La | 7 | 0.5 | 0.4 | Size 2 | 3469 | 42 | 9 |
| 45 | 8 | 0.05 | La | 7 | 0.5 | 1.5 | Size 2 | 3496 | 42 | 17 |
| 46 | 8 | 0.05 | La | 7 | 0.5 | 1.5 | Size 4 | 3422 | 48 | 19 |
| *47 | 8 | 0.05 | Sm | 7 | 0.5 | 0.4 | Size 2 | 3471 | 40 | 5 |
| 48 | 8 | 0.05 | Sm | 7 | 0.5 | 1.5 | Size 2 | 3416 | 41 | 15 |
| 49 | 8 | 0.05 | Sm | 7 | 0.5 | 1.5 | Size 4 | 3408 | 39 | 14 |

TABLE 1C

| Sample Number | Composition (parts by mol/100 parts by mol of Ti) | | | | | | Chip Size | Relative Permittivity | High Temperature Load Test | |
|---|---|---|---|---|---|---|---|---|---|---|
| | Ca | Mg | R Type | R | Zr | Sr | | | MTTF (hr) | Shortest Time to Failure (hr) |
| *50 | 8 | 0.05 | Eu | 7 | 0.5 | 0.4 | Size 2 | 3402 | 38 | 6 |
| 51 | 8 | 0.05 | Eu | 7 | 0.5 | 1.5 | Size 2 | 3411 | 36 | 15 |
| 52 | 8 | 0.05 | Eu | 7 | 0.5 | 1.5 | Size 4 | 3429 | 39 | 19 |
| *53 | 8 | 0.05 | Gd | 7 | 0.5 | 0.4 | Size 2 | 3386 | 38 | 5 |
| 54 | 8 | 0.05 | Gd | 7 | 0.5 | 1.5 | Size 2 | 3383 | 36 | 17 |
| 55 | 8 | 0.05 | Gd | 7 | 0.5 | 1.5 | Size 4 | 3350 | 37 | 14 |
| *56 | 8 | 0.05 | Tb | 7 | 0.5 | 0.4 | Size 2 | 3353 | 37 | 2 |
| 57 | 8 | 0.05 | Tb | 7 | 0.5 | 1.5 | Size 2 | 3345 | 34 | 18 |
| 58 | 8 | 0.05 | Tb | 7 | 0.5 | 1.5 | Size 4 | 3384 | 37 | 13 |
| *59 | 8 | 0.05 | Ho | 7 | 0.5 | 0.4 | Size 2 | 3299 | 36 | 6 |
| 60 | 8 | 0.05 | Ho | 7 | 0.5 | 1.5 | Size 2 | 3230 | 39 | 12 |
| 61 | 8 | 0.05 | Ho | 7 | 0.5 | 1.5 | Size 4 | 3222 | 33 | 13 |
| *62 | 8 | 0.05 | Er | 7 | 0.5 | 0.4 | Size 2 | 3301 | 35 | 8 |
| 63 | 8 | 0.05 | Er | 7 | 0.5 | 1.5 | Size 2 | 3310 | 37 | 17 |
| 64 | 8 | 0.05 | Er | 7 | 0.5 | 1.5 | Size 4 | 3284 | 37 | 15 |
| *65 | 8 | 0.05 | Tm | 7 | 0.5 | 0.4 | Size 2 | 3196 | 33 | 2 |
| 66 | 8 | 0.05 | Tm | 7 | 0.5 | 1.5 | Size 2 | 3159 | 33 | 13 |
| 67 | 8 | 0.05 | Tm | 7 | 0.5 | 1.5 | Size 4 | 3204 | 31 | 15 |
| *68 | 8 | 0.05 | Yb | 7 | 0.5 | 0.4 | Size 2 | 3135 | 30 | 2 |
| 69 | 8 | 0.05 | Yb | 7 | 0.5 | 1.5 | Size 2 | 3126 | 34 | 13 |
| 70 | 8 | 0.05 | Yb | 7 | 0.5 | 1.5 | Size 4 | 3177 | 31 | 16 |

The external dimensions of the multilayer ceramic capacitors were adapted to have respective dimensions below.

(Size 1) Length L: 1.0 mm, Width W: 0.5 mm, Thickness T: 0.5 mm (Size 2) Length L: 1.6 mm, Width W: 0.8 mm, thickness T: 0.8 mm (Size 3) Length L: 2.0 mm, Width W: 1.25 mm, Thickness T: 1.25 mm (Size 4) Length L: 3.2 mm, Width W: 2.5 mm, Thickness T: 2.5 mm (Size 5) Length L: 4.5 mm, Width W: 3.2 mm, Thickness T: 3.2 mm The dielectric layer interposed between the internal electrodes was 3 μm in thickness, and the number of dielectric layers was 100 in any of the sizes.

For each of the samples shown in Tables 1A, 1B, and 1C, the relative permittivity was measured, and lifetime characteristics were measured through a high-temperature load test.

The relative permittivity was measured by the following method. First, the electrostatic capacitance of the multilayer ceramic capacitor was measured under the conditions of: measurement voltage: 1 Vrms and frequency: 1 kHz with the use of an automatic bridge-type measurement instrument, and the relative permittivity was calculated from the measured electrostatic capacitance.

The high-temperature load test was carried out under the following condition. Particularly, a direct-current voltage of 100 V was applied at 150° C. to one hundred multilayer ceramic capacitors, thereby observing the change in insulation resistance with the passage of time. Specifically, a failure occurrence was determined when the insulation resistance value for each multilayer ceramic capacitor was decreased to 10 kΩ or less. In addition, the time to failure was analyzed from a Weibull plot for one hundred capacitors, thereby figuring out the mean time to failure (MTTF) and the shortest time to failure. The shortest time to failure refers to the time to failure for the first capacitor. It is to be noted that test voltage applied is preferably made lower than 250 V.

[Evaluation of Characterization]

From Tables 1A, 1B, and 1C, it has been confirmed that the samples that meet the requirements of the present invention, that is, the samples that meet the condition that: Sr is 0.5 to 3.0 parts by mol, Ca is 3 to 15 parts by mol, Zr is 0.05 to 3.0 parts by mol, Mg is 0.01 to 0.09 parts by mol, and R is 2.5 to 8.4 parts by mol, when Ti is 100 parts by mol (the samples of sample numbers without * marked) have high resistance to insulation degradation and high reliability with the relative permittivity of 3000 or more, and with the MTTF of 20 hours or longer and the shortest time to failure of 10 hours or longer. Thus, the variation in lifetime is small in the high-temperature load test.

It has been confirmed that in particular, when R is 5.7 to 8.4 parts by mol, higher reliability is achieved with the further increased MTTF of 30 hours or longer.

In addition, even when the R of $R_2O_3$ refers to not only Dy but also Y, La, Sm, Eu, Gd, Tb, Ho, Er, Tm, and Yb, the same effects, that is, the relative permittivity of 3000 or more, and the MTTF of 20 hours or longer and the shortest time to failure of 10 hours or longer have been achieved.

In addition, when the length L, width W, and thickness T of the laminated body were respectively 4.5 mm, 3.2 mm, and 3.2 mm as in the samples of sample numbers 38 to 40, the shortest time to failure was shorter than 10 hours, without exhibiting the effect of adding Sr.

In this regard, although not shown in Tables 1A to 1C, it has been confirmed that any multilayer ceramic capacitor having a length L of 1.0 mm to 3.2 mm, a width W of 0.5 mm to 2.5 mm, and a thickness T of 0.5 mm to 2.5 mm achieves the same effects, that is, the relative permittivity of 3000 or more, and the MTTF of 20 hours or longer and the shortest time to failure of 10 hours or longer.

Further, although not shown in Tables 1A to 1C, multilayer ceramic capacitors of the size 1 and multilayer ceramic capacitors of smaller than the size 1 originally have high reliability even when Sr is not added, and the effect of adding Sr on the capacitors can be considered insignificant. On the other hand, the multilayer ceramic capacitors of larger than the size 1 have low reliability when no Sr is added, but the capacitors are configured to meet the requirements of the present invention with the addition of Sr, thereby making it possible to achieve multilayer ceramic capacitors with high reliability.

The present invention is not to be considered limited to the embodiment described above. For example, in the foregoing description, the dielectric layers 12 have been explained as containing Ba, Sr, Ti, Ca, Zr, Mg, and R, where R represents at least one element of Y, La, Sm, Eu, Gd, Tb, Dy, Ho, Er, Tm, and Yb, and as described above regarding the contents in terms of part by mol for each of the elements when the amount of Ti is 100 parts by mol. However, as long as the internal electrodes 13 of the laminated body 11 contain none of the respective elements of Ba, Sr, Ti, Ca, Zr, Mg, and R, the laminated body 11 can be considered as containing the contents in terms of part by mol for each of the elements Ba, Sr, Ti, Ca, Zr, Mg, and R.

What is claimed is:

1. A multilayer ceramic capacitor comprising:
   a laminated body having multiple dielectric layers and internal electrodes laminated alternately therewith, the dielectric layers containing Ba, Sr, Ti, Ca, Zr, Mg, and R,
   wherein R represents at least one element of Y, La, Sm, Eu, Gd, Tb, Dy, Ho, Er, Tm, and Yb, and
   the dielectric layers containing, when Ti is 100 parts by mol:
   Sr at 0.5 to 3.0 parts by mol;
   Ca at 3 to 15 parts by mol;
   Zr at 0.05 to 3.0 parts by mol;
   Mg at 0.01 to 0.09 parts by mol; and
   R at 2.5 to 3.4 parts by mol or less.

2. The multilayer ceramic capacitor according to claim 1, wherein the laminated body has a length of 1.0 mm to 3.2 mm, a width of 0.5 mm to 2.5 mm, and a thickness of 0.5 mm to 2.5 mm.

3. The multilayer ceramic capacitor according to claim 1, wherein each dielectric layer has a thickness of 0.4 μm to 3.0 μm.

4. The multilayer ceramic capacitor according to claim 1, wherein R is 5.7 to 8.4 parts by mol.

5. A multilayer ceramic capacitor comprising:
   a laminated body having multiple dielectric layers and internal electrodes laminated alternately therewith, the laminated body containing Ba, Sr, Ti, Ca, Zr, Mg, and R,
   wherein R represents at least one element of Y, La, Sm, Eu, Gd, Tb, Dy, Ho, Er, Tm, and Yb, and
   the laminated body containing, when Ti is 100 parts by mol:
   Sr at 0.5 to 3.0 parts by mol;
   Ca at 3 to 15 parts by mol;
   Zr at 0.05 to 3.0 parts by mol;
   Mg at 0.01 0.09 parts by mol; and
   R at 2.5 to 8.4 parts by mol.

6. The multilayer ceramic capacitor according to claim 5, wherein the laminated body has a length of 1.0 mm to 3.2 mm, a width of 0.5 mm to 2.5 mm, and a thickness of 0.5 mm to 2.5 mm.

7. The multilayer ceramic capacitor according to claim 5, wherein each dielectric layer has a thickness of 0.4 μm to 3.0 μm.

8. The multilayer ceramic capacitor according to claim 5, wherein R is 5.7 to 8.4 parts by mol.

9. A multilayer ceramic capacitor comprising:
   a laminated body of multiple dielectric layers and internal electrodes laminated alternately therewith, the laminated body containing Ba, Sr, Ti, Ca, Zr, Mg, and R,
   wherein R represents at least one element of Y, La, Sm, Eu, Gd, Tb, Dy, Ho, Er, Tm, and Yb, and when the laminated body is subjected to a dissolution treatment to provide a solution, when Ti in the solution is 100 parts by mol, the solution contains:
   Sr at 0.5 to 3.0 parts by mol;
   Ca at 3 to 15 parts by mol;
   Zr at 0.05 to 3.0 parts by mol;
   Mg at 0.01 to 0.09 parts by mol; and
   R at 2.5 to 8.4 parts by mol.

10. The multilayer ceramic capacitor according to claim 9, wherein the laminated body has a length of 1.0 mm to 3.2 mm, a width of 0.5 mm to 2.5 mm, and a thickness of 0.5 mm to 2.5 mm.

11. The multilayer ceramic capacitor according to claim 9, wherein each dielectric layer has a thickness of 0.4 μm to 3.0 μm.

12. The multilayer ceramic capacitor according to claim 9, wherein R is 5.7 to 8.4 parts by mol.

13. A method for manufacturing a multilayer ceramic capacitor, the method comprising:

alternately stacking ceramic green sheets for dielectric layers and electrode material layers for internal electrodes so as to form an unfired stacked body; and firing the unfired stacked body to produce a fired laminated body, wherein the ceramic green sheets for the dielectric layers contains Ba, Sr, Ti, Ca, Zr, Mg, and R, where R represents at least one element of Y, La, Sm, Eu, Gd, Tb, Dy, Ho, Er, Tm, and Yb, and when Ti is 100 parts by mol:

Sr is 0.5 to 3.0 parts by mol;

Ca is 3 to 15 parts by mol;

Zr is 0.05 to 3.0 parts by mol;

Mg is 0.01 to 0.09 parts by mol; and

R is 2.5 to 8.4 parts by mol.

14. The method for manufacturing a multilayer ceramic capacitor according to claim 13, wherein the fired laminated body has a length of 1.0 mm to 3.2 mm, a width of 0.5 mm to 2.5 mm, and a thickness of 0.5 mm to 2.5 mm.

15. The method for manufacturing a multilayer ceramic capacitor according to claim 13, wherein each dielectric layer has a thickness of 0.4 μm to 3.0 μm.

16. The method for manufacturing a multilayer ceramic capacitor according to claim 13, wherein R is 5.7 to 8.4 parts by mol.

* * * * *